Jan. 19, 1960   R. P. SHEVCHENKO   2,921,805
PRESSURE RELIEVED RING SEAL
Filed Dec. 31, 1956

INVENTOR
RICHARD P. SHEVCHENKO
BY *Charles A. Warren*
ATTORNEY

United States Patent Office 2,921,805
Patented Jan. 19, 1960

2,921,805

PRESSURE RELIEVED RING SEAL

Richard P. Shevchenko, Marlborough, Conn., assignor to United Aircraft Corporation, East Hartford, Conn., a corporation of Delaware Application December 31, 1956, Serial No. 631,564

7 Claims. (Cl. 286—11.13)

The invention relates to a carbon-type of seal and particularly to a seal adapted to seal relatively high pressures.

In sealing against high pressures, the seal has in the past been held against the sealing surfaces by the pressure being sealed and the resulting high frictional drag between the seal ring and the cooperating part results in rapid destruction of the seal both by wear and heat. One feature of the invention is a seal in which these high frictional forces may be avoided. Another feature is a seal in which the spring acts to hold the seal against the sealed pressures such that the pressure between the sealing ring and the cooperating surface is more readily controlled. Another feature is a multiple seal in which a portion of the pressure is held by each of several seals in series with an arrangement for dividing the pressure load between the several seals.

Other features and advantages will be apparent from the specification and claims, and from the accompanying drawings which illustrate an embodiment of the invention.

Figure 1:
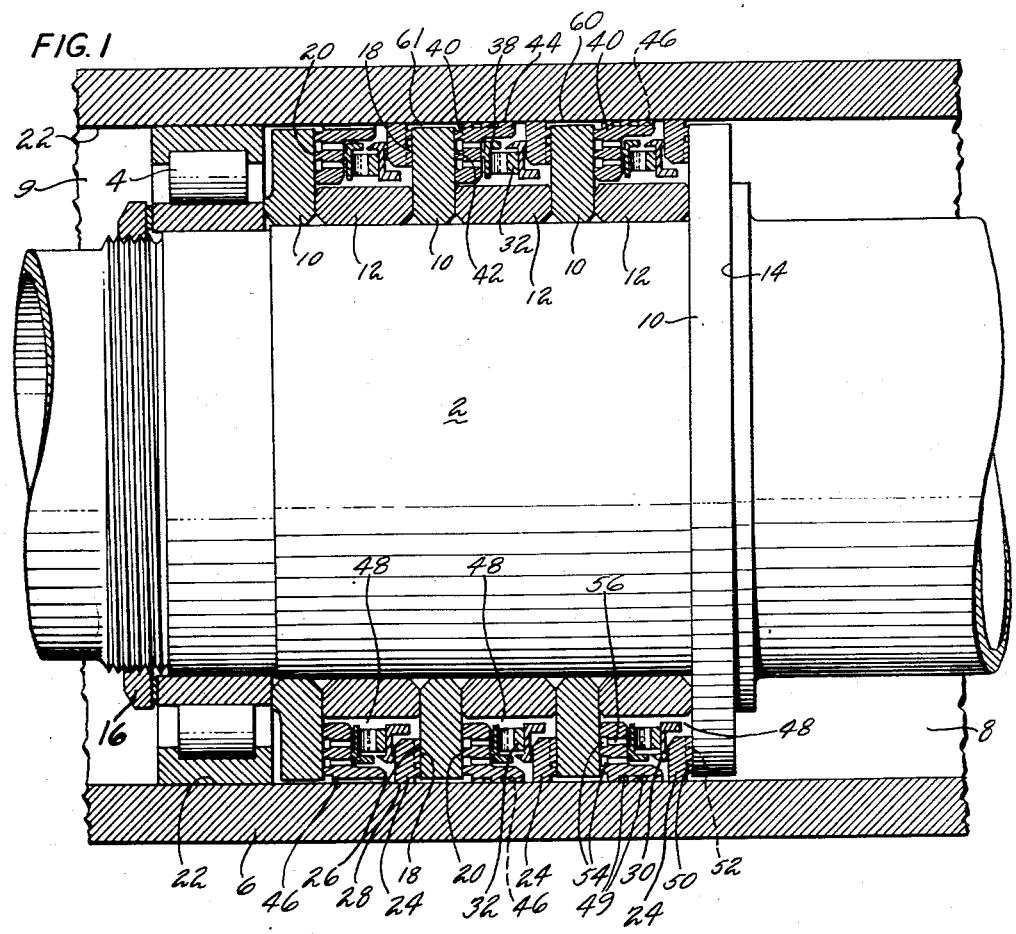
Fig. 1 is an axial sectional view of a seal embodying the invention.

The seal is shown as applied to a shaft 2 supported by bearing 4 within a casing 6. The seal prevents an escape of air under pressure from the space 8 between the casing and the shaft into the space 9 in which the bearing is located. In many instances, air pressures become so high that the usual seal is inadequate. This seal is particularly adapted for use in a gas turbine power plant, for example, at the downstream end of the compressor, where the hot air or gas at high pressures must be sealed out of the bearing spaces to avoid damage to the bearing.

The shaft 2 has a plurality of axially spaced flanges 10 thereon, the flanges being held apart by spacers 12 and all being clamped against a shoulder 14 as by a clamping nut 16. Each of the flanges 10 provides opposed radially extending sealing surfaces 18 and 20, the surfaces 18 being on the side of the flange adjacent to the bearing and the surface 20 being on the side of the flange away from the bearing. The peripheries of these flanges are spaced slightly from a cylindrical sealing surface 22 on casing 6. It will be understood that the shaft is a rotary shaft, and the casing may be stationary or rotating. If the casing rotates its normal rotation would be either in a direction opposite to that of the shaft or at a different rate.

The seal includes a number of sealing rings 24 each having a radially extending sealing face 26 which engage with the sealing surface 18. Each sealing ring 24 also has a cylindrical outer seal face 28 engaging with the sealing surface 22. Each seal ring 24 is supported by a thrust ring 30 which is urged toward the right, Fig. 1, by a wave spring 32. This spring exerts a predetermined force on the seal ring 24 to hold it against the cooperating surface 18. As will be apparent, the several seal rings 24 are in series arrangement in the passage where sealing is required so that each seal 24 resists only a part of the pressure existing in the space 8. The seal rings 24 are split rings and have resilience such that they are urged against the cylindrical surface 22 and are additionally held against this surface by centrifugal force resulting from the rotation of the seal ring.

The wave spring 32 is backed up by another thrust ring 38 which engages with a ported seal 40. This seal has a sealing face 42 engaging with the radial sealing surface 20 and a cylindrical face 44 engaging with the cylindrical surface 22. Each of the seal rings 40 has one or more axially extending grooves 46 for the controlled leakage of fluid from the space 48 between each pair of seals 24 and 40 past the seal 40 to be sealed by the next adjacent seal ring 24.

For the purpose of minimizing the effect of the pressure in the spaces 8, 60, 61 on the seal rings 24, the latter may have a circumferential groove 50 in the sealing face 26 and radial groove 52 communicating from space 48 to the groove 50. Similarly, the seal 40 may have circumferential grooves 54 in the sealing face 42 and axial extending passages 56 through the seal ring communicating with the space 48. These rings 40 may also have circumferential grooves 49 in the outer surface for the same purpose.

In operation, assuming that there is a total pressure of 90 lbs. per square inch in the space 8 and that each of the wave springs 32 is designed to resist a pressure of 30 lbs. per square inch, the pressure in the space 8 will lift the first seal ring 24 (the right hand seal ring) since the pressure is higher than that exerted by the first spring 32. The pressure will continue to bleed into the first space 48 until the rising pressure in this space, plus the spring force, balances the pressure in the space 8. At this point, there will be a pressure of 60 lbs. in the first space 48. This 60 lbs. pressure, however, bleeds past the first ported seal 40 to act against the second seal ring 24 and will escape past the second seal ring until the pressure in the second space 48 plus the spring force of the second wave spring will balance the pressure in the first space 48.

Similarly, the rising pressure in the second space 48 will bleed past the second ported seal but will be held by the third stage seal ring 24. Thus, with each wave spring holding the corresponding sealing ring in position with a force of 30 lbs. per square inch in which the total pressure of 90 lbs. per square inch in the space 8 will be resisted by the three rings in series. It will be apparent that for pressures lower than the specific pressure given as an example, the seals are adequate as shown, or may be better adapted to such lower pressures as by changing the spring rate or by varying the number of stages of seals.

Figure 2:
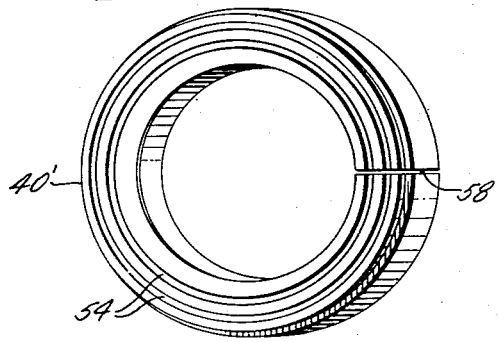
Fig. 2 is a perspective view of a modification of one of the seal rings.

For pressures above what the three seals 24 and their springs, as above described, will hold, the seal rings 40 may be made to take part of the pressure drop. Thus referring to Fig. 2, instead of having one or more cross grooves 46, as in Fig. 1, the first or right hand seal 40' will have a sealing surface which is continuous except for the split 58 in the ring which will allow a small leakage but which will act to throttle the flow and produce a pressure drop across the seal. Similarly, each of the other seal rings 40 will have the same throttling passage or split. Thus, if the seals are expected to seal against a pressure of 150 p.s.i., and the springs are set to resist a pressure of 30 p.s.i., the first or right hand seal ring 24 will permit leakage until the pressure in the right hand space is 120 p.s.i. The right hand seal 40 will allow leakage through the split with a pressure drop of 20 p.s.i. such that the space to the left of the right hand seal 40 will be at 100 p.s.i. The middle seal 24 will hold another 30 p.s.i. and the second or middle seal 40 will hold another 20 p.s.i. thus lowering the leakage pressure to 50 p.s.i. The last seal ring 24 will hold another 30 p.s.i. and the last seal ring 40 will hold another 20 p.s.i. such that the pressure beyond the last ring 40 is at 0 p.s.i.

If the fluid sealed is compressible, the successive rings 40 in a downstream direction will of necessity have the peripheral grooves progressively larger in number or area to accommodate the larger volume of the fluid at the lower pressures. If, however, the fluid is a liquid, the several peripheral grooves may be the same number and area.

Furthermore, although a multiple seal has been described, it will be apparent that one pair of seal rings 24 and 40 will be adequate where the pressures are not excessive and the seals will perform with much less wear than would a single seal ring held in sealing position by a heavier spring.

It is to be understood that the invention is not limited to the specific embodiment herein illustrated and described, but may be used in other ways without departure from its spirit as defined by the following claims.

I claim:

1. In a multiple seal construction, a plurality of axially spaced flanges on a shaft each having a sealing face, a plurality of seal rings, each ring engaging one seal engaging face, a surrounding casing member having a substantially ciylindrical seal engaging surface engaging with said seal rings, and a thrust ring for each seal ring, a spring engaging each thrust ring and urging each thrust ring axially to hold the associated seal ring against the sealing face on the associated flange in opposition to the pressure being sealed, and other seal rings, one of which is between each of said first seal rings, one of each of said other seal rings being in engagement with each of the flanges and with the cylindrical seal engaging surface, said other seal rings each having metering grooves for permitting a limited leakage of pressure past said other ring.

2. In a multiple seal construction, a shaft member, a surrounding casing member, one of said members being rotatable with respect to the other, one of said members having a substantially cylindrical internal sealing surface, and the other member having a plurality of axially spaced radially extending flanges projecting toward said cylindrical face and each having a substantially radial sealing surface thereon, a plurality of sealing rings each having a substantially radial sealing face, one ring engaging with the sealing face on each of the flanges, each ring also having a cylindrical sealing face engaging with said cylindrical sealing surface and held thereagainst by centrifugal force as the ring rotates, spring means acting on each sealing ring for holding it resiliently against the radial sealing surface in opposition to the pressure being sealed, the spring force of each spring means being less than the normal total pressure being sealed and a thrust ring engaging each sealing ring and the cooperating spring.

3. In a multiple seal construction, a shaft member, a surrounding casing member, one of said members being rotatable with respect to the other, one of said members having a substantially cylindrical internal sealing surface, and the other member having a plurality of axially spaced radially extending flanges projecting toward said cylindrical face and each having a substantially radial sealing surface thereon, a plurality of sealing rings each having a substantially radial sealing face, one ring engaging with the sealing face on each of the flanges, each ring also having a cylindrical sealing face engaging with said cylindrical sealing surface and held thereagainst by centrifugal force as the ring rotates, spring means acting on each sealing ring for holding it resiliently against the cooperating radial sealing surface in opposition to the pressure being sealed, and a plurality of ported seal rings, one of said ported seal rings being located between each of said first sealing rings for limiting the rate of flow between said rings.

4. In a multiple seal construction, a shaft member, a surrounding casing member, one of said members having a substantially cylindrical sealing surface, and the other member having a plurality of axially spaced radially extending flanges projecting toward said cylindrical face, each flange having opposed radial sealing surfaces thereon, a plurality of sealing rings one ring engaging each of one of the radial sealing surfaces on the flanges and the cylindrical sealing surface, spring means acting on each sealing ring and holding each of said sealing rings against said radial sealing surfaces in opposition to the pressure being sealed, and other sealing rings, one of said other sealing rings engaging each of the other radial sealing surfaces on the flanges and said cylindrical sealing surface, said other sealing rings being ported to control the leakage past said rings.

5. In a multiple seal construction adapted for sealing against leakage of a fluid past said seal and for maintaining a pressure differential across said seal, a shaft member, a surrounding casing member, one of said members being rotatable with respect to the other, one of said members having substantially cylindrical inner sealing surfaces and the other member having a plurality of axially spaced radially extending flanges projecting toward said cylindrical face and each having a substantially radial sealing surface thereon, there being a clearance between said flanges and the adjacent cylindrical seal face past which the sealing fluid may leak, a plurality of sealing rings, one for each flange, each ring engaging the sealing surface on the associated flange and also engaging the inner cylindrical sealing surface, each ring being positioned such that the pressure differential across the clearance tends to move the seal away from the cooperating sealing surface of the flange and a spring acting on each seal ring and urging each seal ring against the sealing surface on the flange in opposition to the pressure of the fluid being sealed, the spring pressure for each spring being less than the total normal pressure being sealed.

6. In a multiple seal construction adapted for sealing against leakage of a fluid past said seal and for maintaining a pressure differential across said seal, a shaft member, a surrounding casing member, one of said members being rotatable with respect to the other, one of said members having substantially cylindrical inner sealing surfaces and the other member having a plurality of axially spaced radially extending flanges projecting toward said cylindrical face and each having opposed radial sealing surfaces thereon, there being a clearance between said flanges and the cylindrical sealing surfaces past which the sealed fluid may leak, a plurality of sealing rings, one for each flange, each ring engaging one of the sealing surfaces on the associated flange and also engaging the cylindrical sealing surfaces, each sealing ring being positioned such that the pressure difference across the clearance tends to move the seal ring away from the cooperating sealing surface on the flange, a spring acting on each sealing ring and urging each sealing ring against the sealing surface on the flange in opposition to the pressure of fluid being sealed and a plurality of ported seal rings, one for each flange, each of said ported rings engaging the other sealing surface on the associated flange with each of said ported rings so positioned that the pressure differential tends to move the ported ring against the cooperating sealing surface on the flange.

7. The combination with a shaft member and a surrounding casing member, one of said members being rotatable with respect to the other and there being a clearance space between the members, of a multiple seal construction positioned in said clearance for sealing against fluid pressure leakage through said clearance space and for maintaining a pressure difference across said seal construction, said seal construction including a series of flanges on one of said members and a cooperating substantially cylindrical surface on the other of said members, each flange having a first sealing surface on one side of the flange and a second sealing surface on the other side of the flange, a plurality of sealing rings, one for each flange, each sealing ring having a sealing surface engaging with the first sealing surface on the associated flange, a spring acting on each of said sealing rings and holding each ring against the associated flange in opposition to the pressure difference across said seal construction, and a plurality of ported seal rings, one for each flange, each ported ring having a seal surface engaging with the second sealing surface on the associated flange, each of said ported rings being so positioned as to be held against the cooperating sealing surface by the pressure difference across the seal construction.

References Cited in the file of this patent

UNITED STATES PATENTS

| | | |
|---|---|---|
| 1,956,366 | Vedovell | Apr. 24, 1934 |
| 2,175,868 | Bentley | Oct. 10, 1939 |
| 2,348,939 | Thompson | May 16, 1944 |
| 2,807,483 | Cornelius | Sept. 24, 1957 |

FOREIGN PATENTS

| | | |
|---|---|---|
| 230,546 | Great Britain | Mar. 12, 1925 |